US008430006B2

(12) United States Patent
Stanojevic

(10) Patent No.: US 8,430,006 B2
(45) **Date of Patent: *Apr. 30, 2013**

(54) ARTICLE SLICER WITH INTEGRAL PICK AND PLACER

(75) Inventor: Ivan Stanojevic, Atlanta, GA (US)

(73) Assignee: Maxwell Chase Technologies, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/293,401

(22) Filed: Nov. 10, 2011

(65) Prior Publication Data

US 2012/0067183 A1 Mar. 22, 2012

Related U.S. Application Data

(62) Division of application No. 12/183,798, filed on Jul. 31, 2008, now Pat. No. 8,069, 763.

(60) Provisional application No. 61/047,965, filed on Apr. 25, 2008.

(51) Int. Cl.
*B26D 3/20* (2006.01)
*B26D 1/03* (2006.01)
*A23N 4/16* (2006.01)

(52) U.S. Cl.
USPC ................ 83/281; 83/437.2; 83/751; 83/932; 426/518; 99/549; 99/643; 414/749.1

(58) Field of Classification Search .................... 83/168, 83/169, 109, 280, 281, 563, 597, 613, 437.2–437.7, 83/339, 78, 751, 932; 426/518; 99/549, 99/551, 560, 564, 565, 643; 100/104, 108, 100/213, 215, 292; 241/166; 414/729–741, 414/749.1–749.3, 751.1–753.1, 404; 53/252, 53/109, 150; 198/750.11, 750.12, 468.4, 198/867.03; 294/183–185, 62.2–65
See application file for complete search history.

(56) References Cited

U.S. PATENT DOCUMENTS

| | | | | |
|---|---|---|---|---|
| 1,448,532 | A * | 3/1923 | Harding | 99/470 |
| 3,093,175 | A * | 6/1963 | Morici | 99/353 |
| 3,258,046 | A * | 6/1966 | Lackerman | 83/751 |
| 3,605,984 | A | 9/1971 | Erekson et al. | |
| 4,233,802 | A * | 11/1980 | Booth et al. | 53/475 |
| 4,368,657 | A * | 1/1983 | Pellaton | 83/356.3 |
| 4,709,535 | A * | 12/1987 | Mahaffy et al. | 53/473 |
| 4,800,704 | A * | 1/1989 | Ishii et al. | 53/145 |
| 5,590,591 | A * | 1/1997 | Kim | 99/544 |
| D388,665 | S | 1/1998 | So | |
| 6,234,071 | B1 * | 5/2001 | Catarain Arregui | 99/504 |
| 7,452,561 | B2 * | 11/2008 | Newman | 426/248 |
| 2002/0170398 | A1 | 11/2002 | Verhaeghe | |
| 2005/0022642 | A1 | 2/2005 | Verhaeghe | |

* cited by examiner

*Primary Examiner* — Laura M. Lee
(74) *Attorney, Agent, or Firm* — Thomas/Horstemeyer, LLP

(57) ABSTRACT

Tomatoes or other articles are placed over moving cutter blades (20) in article openings of an article locator of an article slicer (10). Article pushers (24) move downwardly and have downwardly extending pusher fins for pushing the tomatoes through the cutter blades. The article pushers are carried by a movable support plate (78) between retracted positions behind the cutter blades and extended positions over the cutter blades. A pick and placer (76) is carried by the same movable support plate (78) and moves simultaneously in the same lateral directions as the article pushers, between positions over the oncoming line of tomatoes on an entrance conveyor (64) and over the cutter blades.

4 Claims, 4 Drawing Sheets

ARTICLE SLICER WITH INTEGRAL PICK AND PLACER

CROSS REFERENCE

This application claims the benefit of U.S. provisional patent application Ser. No. 61/047,965, filed Apr. 25, 2008, and is a division of U.S. application Ser. No. 12/183,798, filed Jul. 31, 2008, now U.S. Pat. No. 8,069,763.

FIELD OF THE INVENTION

This invention concerns a method and apparatus for simultaneously cutting several articles into parallel slices, gathering the slices from the several articles in an accumulation of articles, and depositing the articles in an awaiting shipping tray. An example of the invention is a method and apparatus for slicing of fruits and vegetables, such as ripe tomatoes, with such gentle care as to reduce the bruising and loss of gel and seed from the slices of tomatoes.

BACKGROUND OF THE INVENTION

When a restaurant is to serve sliced food items, such as sliced tomatoes, a substantial amount of preparation time would be required at the restaurant to slice and otherwise prepare the sliced products. After the food products are purchased and delivered to the restaurant, typically they would have to be cleaned, sliced, and made available for placement on the salad, sandwich, or other menu item. It is somewhat difficult for the person slicing the food items to prepare slices of uniform width and consistency and there is a substantial amount of waste because of improper slicing, etc. and there is the potential for cross contamination in the restaurant.

In the instance of fast food restaurant chains, the owners of the restaurant chain usually desire to present a uniform food product, such as hamburgers of uniform size, appearance and taste, with sliced tomatoes applied to the hamburgers, and with the hamburgers and all of the ingredients being substantially identical from one restaurant to another. It has become important that tomatoes, in particular, be sliced to a desired thickness when placed on sandwiches, salads, etc. of a restaurant of a chain of fast food restaurants. This provides the customer with confidence that the food products will be uniform from one restaurant to another within a chain of the restaurants. Accordingly, restaurant managers now prefer to receive food items in proper configuration and condition for placement on a sandwich, salad, etc., for immediate service to the customer without requiring the preliminary preparation steps such as slicing the food products.

Manual handling of slices of tomatoes, such as described above, adds to potential public health issues from contamination and adds to the potential of bruising the products and liquid loss from the products.

It is therefore desirable that the design and operation of a tomato slicer take into consideration the delicate nature of the tomato, the importance of minimizing the impact of the slicer on the tomatoes, the cleanliness of the equipment performing the slicing process, and the speed of operation of the slicer.

Various prior art slicing machines have been disclosed for the purpose of slicing food products. The prior art includes U.K. Patent Specification 600,131 dated Sep. 28, 1945 that discloses a slicer that would push potatoes through parallel cutter wires to form the potatoes into a pair of end slices and a plurality of intermediate slices of uniform thickness. The end slices are to be collected separately from the intermediate slices.

U.S. Pat. No. 6,799,496 discloses a slicing device similar to the U.K. potato slicer that would simultaneously push a plurality of tomatoes through parallel reciprocating cutter blades.

U.S. patent publications 2006/0021484 and 2006/0225547 disclose article slicers and methods suitable for slicing tomatoes and other relatively soft articles into parallel slices while discarding the heel portions and the stem portions of the bodies of the articles.

Publication 2006/0225547 discloses an article slicer with fluid cleaning of some of the surfaces and an external pick and placer that may be aligned with the slicer to place tomatoes in the slicer.

It is a problem with some prior art article slicers to effectively and efficiently clean the surfaces of the slicer during operation and after operation of the slicer. For example, when the slicer is used to slice tomatoes and other articles that leave a residue on the surfaces of the slicer, the parts may have to be disassembled, cleaned and reassembled.

A desired feature of article slicers is the cleaning of the equipment after the equipment has been used without having to disassemble the slicer. It is desirable to remove any particles, such as the skin of a tomato, seeds or other residue, and the juices exuded from the articles during the slicing and handling operations, and it is desirable to apply a disinfectant to the surfaces of the equipment that make contact with the articles so that the equipment is sanitized before reuse.

Another desired feature for article slicers is the feeding of the articles, such as tomatoes, to the slicer in sufficient quantity and in the proper pattern that matches the intake requirements of the slicer for maximizing the operational speed of the slicer without reducing the quality of the work product.

It is these features and problems that this invention addresses.

SUMMARY OF THE TECHNOLOGY

The equipment disclosed herein provides the steps of expediently slicing articles and gathering and delivering slices of articles, including tomatoes, in such a way as to reduce the hazard of deterioration of the slices, such as reducing the amount of liquid loss from the slices and reducing the bruising of the slices, and is useful for performing these functions over a large size range of articles.

This equipment includes a pick and placer that is integrally mounted to an article slicer and works in unison with the cutting function of the article slicer. Since the pick and placer is not normally removed from the slicer during the cleaning procedures, the maintenance personnel usually do not have to re-align the pick and placer with the slicer.

The integration of the pick and placer with the article slicer allows components of the pick and placer to move in unison with the article slicer, and be powered by the components of the article slicer. This tends to increase the speed of operation of the equipment without sacrificing the quality of the work product.

The apparatus includes a plurality of cutter blades spaced from one another in parallel planes for cutting the articles into slices. Article locators may be positioned over the cutter blades to retain the articles in the desired positions before the slicing operations begin. The articles, such as tomatoes, may be placed in the article locators and directly on and supported by the cutter blades. Alternate ones of the cutter blades may move in opposite directions and the cutter blades may be oscillated in arcuate motions along their lengths during the cycle of cutting the articles to enhance the cutting function, and article pushers are used to push the tomatoes through the moving blades.

An article pusher is used for each line of articles to be cut, and each article pusher includes a plurality of pusher fins sized and shaped to move downwardly between the cutter blades to assure that the slices are pushed through and beyond the cutter blades.

The improved article pusher engages and urges the tomatoes in a downward direction through moving cutting blades, with the article pushers having an improved shape suitable for rapid and thorough cleaning during and after use of the article slicing machine.

To begin the cutting cycle, the article pushers are located in the article loading position that is laterally spaced inwardly from over the article locators. This provides room for the articles to be placed in the article locators. The articles such as tomatoes may be placed in the article locators directly on the cutter blades. The article pushers move in an L-shaped path, first outwardly from the retracted loading position spaced laterally inwardly from over the article locators to a position aligned over the articles on the cutter blades. The pushers then move downwardly into engagement with the articles resting on the cutter blades to push the articles gently through the cutter blades. The pushers are configured to extend downwardly between the cutter blades, thereby pushing the articles on through the cutter blades. This results in positively moving all slices of the articles through and beyond the cutter blades.

The cutter blades are oscillated as the pushers move the tomatoes into contact with and on through the cutter blades. The article pushers are then retracted vertically back up through the cutter blades and when clear of the cutter blades are withdrawn laterally back into the original article loading positions where they are out of the way for loading the next batch of articles in the positioning plate.

The pick and placer moves between its positions in response to and by the same equipment of the slicer. When the pick and placer has retrieved articles from the entrance conveyor and the pushers are being withdrawn from the article locator, the pick and placer moves from the entrance conveyor over to the article locator where it deposits the articles in the article locator and on the cutter blades. The pick and placer is driven in the same lateral directions by the slicer between the article locator and the entrance conveyor. During the time the article pushers are being retracted so that the article locator is being cleared, the pick and placer moves simultaneously and in the same direction in its loading cycle. The suction cups of the pick and placer pick up the articles in the first row of articles from the entrance conveyor and move inwardly from the entrance conveyor to positions over the article locator. The suction cups of the pick and placer are lowered and the uncut articles are placed on the cutter blades.

Withdrawal of the pick and placer from the article locator is also driven by the slicer and in timed relationship with the article pushers.

The L-shaped movement of the article pushers being integrated with the movement of the pick and placer increases the time during each cycle in which access can be made to the article locators. The pick and placer does not have to wait until the article pushers have cleared before starting to move inwardly into their delivery positions. This allows the article slicer to reduce its cycle time and increase the number of cycles per minute, increasing the number of work products per minute.

The article slicer includes a plurality of cutter blades extending in parallel planes and spaced from one another for cutting the articles into slices, article pushers supported for pushing a plurality of the articles downwardly through the article locator and the cutter blades, a pusher actuator operatively connected to said article pushers for moving the article pushers: forwardly from withdrawn positions spaced laterally behind the article locator to over the positions of the article locator, downwardly into engagement with articles located at the cutting blades and downwardly through the cutter blades to push the articles through the cutter blades, upwardly from the cutter blades back to the positions over the cutter blades, and rearwardly from the positions over the cutter blades to the withdrawn positions.

The pick and placer is operatively connected to said pusher actuator for movement in timed relationship with the movements of said pushers: forwardly with the forward movement of said pushers from over positions of said article actuator to positions of articles to be sliced, and rearwardly with the rearward movement of said pushers to move the articles to be sliced to the positions over said cutter blades.

The pick and placer includes a pusher and placer actuator movable in unison with said forward and rearward movements of said pushers for moving said pick and placers forwardly away from said pushers when said pushers are moved forwardly and rearwardly toward said pushers when said pushers are moved rearwardly.

The article slicer may also include: a movable support plate, a plurality of article pushers carried by said movable support plate, movable support plate drive means for laterally reciprocating said movable support plate, article pusher vertical drive means for vertically reciprocating said article pushers with respect to said movable support plate, a pick and place platform carried by said movable support plate, a pick and place drive means carried by said movable support plate for laterally reciprocating said pick and place platform with respect to said movable support plate, a plurality of pickers carried by said pick and place platform, and pick and place vertical drive means carried by said pick and place platform for vertically reciprocating said pickers.

The pusher includes an upper body portion and a plurality of fins extending in a downward direction from the upper body portion. The fins are oriented parallel to one another and define fin spaces between the fins for receiving the cutter blades, and the fins include distal ends for passing through the blade spaces. A passage is defined by the upper body portion, including an entrance opening extending laterally from outside said upper body portion to the fin spaces for passing fluid from outside the upper body portion to the fin spaces, such that fluid may pass laterally from outside the upper body portion and through the passage and move through the fin spaces and contact the fins. The entrance opening extends substantially parallel to the fins for directing a stream of fluid into said pusher generally parallel to said fins.

The entrance opening of the article pusher may include entrance openings on opposite sides of the pusher that extend substantially parallel to the fins for directing a stream of fluid into the pusher generally parallel to the fins.

The fluid used for application to the fins of the article pusher, cutter blades and to other surfaces of the equipment may be selected from a liquid, a gas, and a liquid-bearing gas. The fluid may include an antimicrobial or other sanitizing additive.

Accordingly, it is an object of this article slicer to provide an improved method and apparatus for slicing articles, such as tomatoes, into slices of predetermined thickness.

It is another object of this article slicer to provide an improved means for cleaning the article slicer.

Another object of this article slicer is to provide an improved system whereby tomatoes may be economically, rapidly, gently and reliably sliced and packaged for delivery to a food service organization, such as fast food restaurants for immediate use and usually without additional preparation.

Another object of this article slicer is to provide an improved design for expediently and thoroughly cleaning the article pushers, and for expediently feeding the articles to the article slicer with a pick and placer that is integrated with the slicer and that operates in unison with and in response to the slicer.

Other objects, features and advantages will be understood from reading the following specification when taken in conjunction with the accompanying drawings.

DETAILED DESCRIPTION

Figure 1:
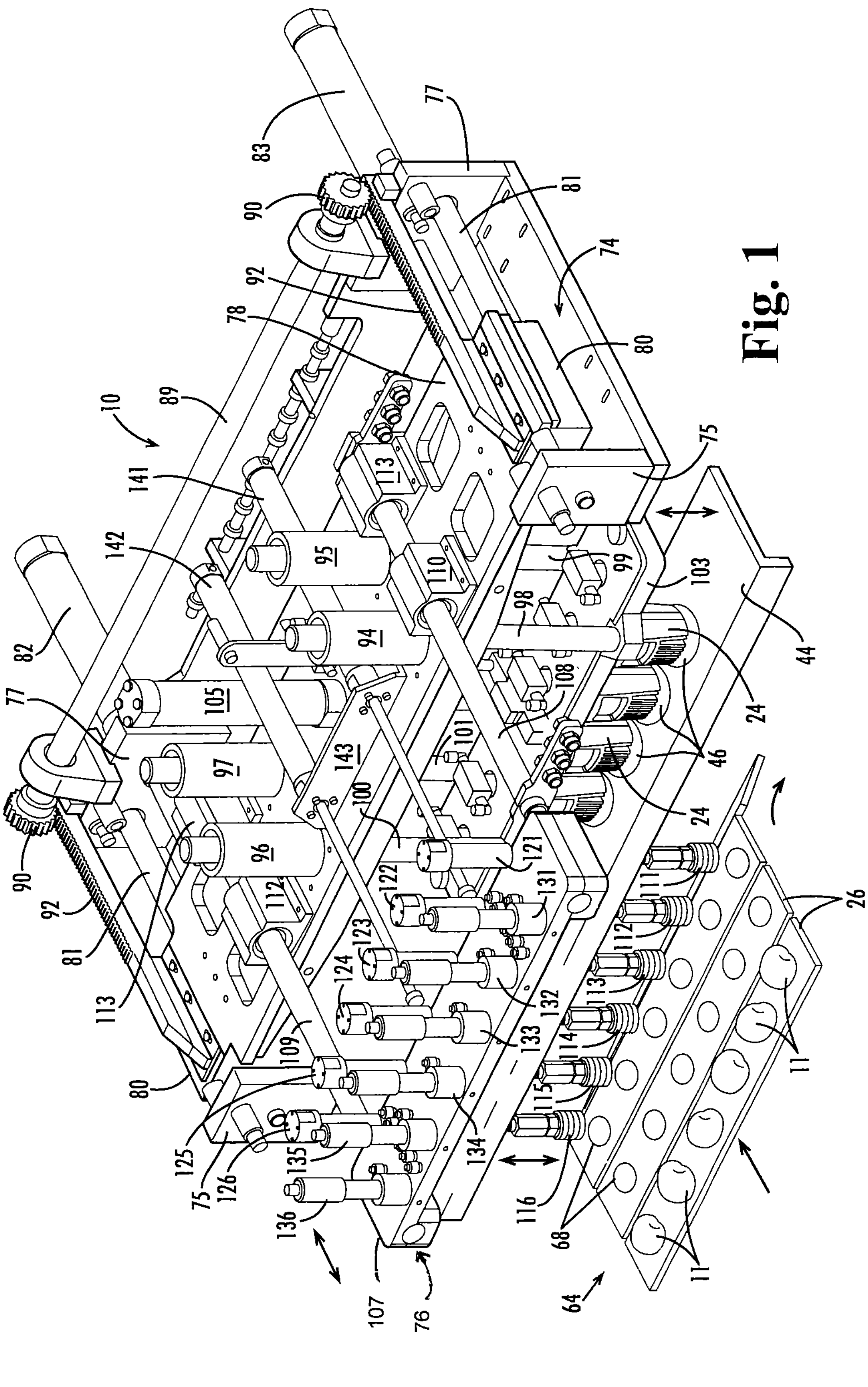
FIG. 1 is a perspective view of an article slicer with the integrally mounted pick and placer.

Referring now in more detail to the drawings in which like numerals indicate like parts throughout the several views, FIG. 1 shows a perspective view of the article slicer 10 that simultaneously slices a plurality of articles such as six tomatoes 11 or other fruits, vegetables, etc., with each article sliced into a pair of end slices and a plurality of intermediate slices. The article slicer may hereafter be described as a tomato slicer, but other articles can be sliced, as may be desired.

Figure 2:
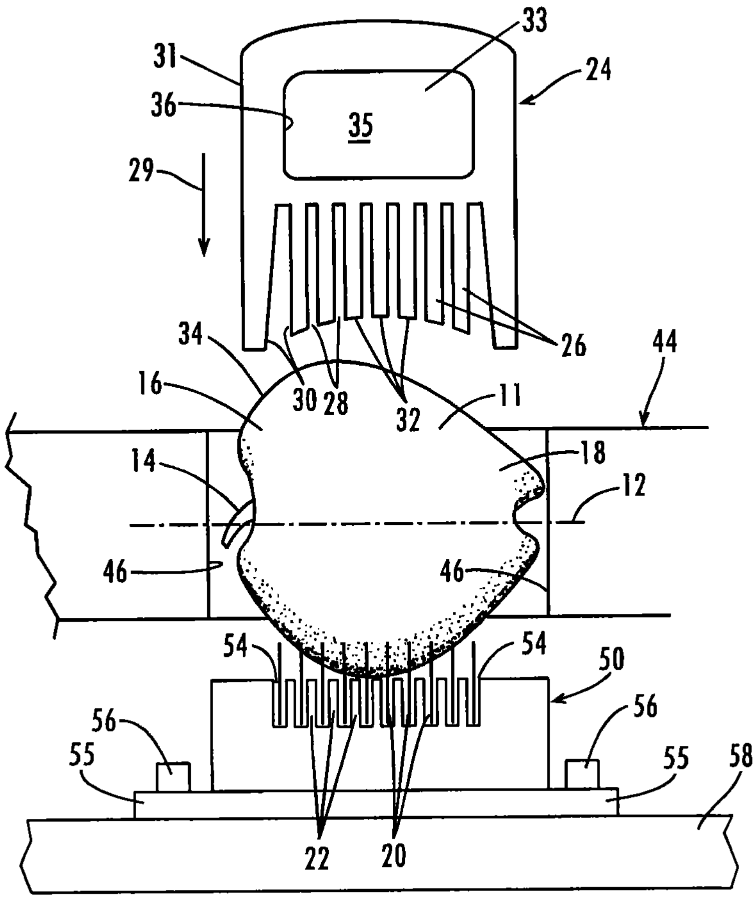
FIG. 2 is a front elevational view of a portion of the article slicer, showing a pusher above a tomato with the tomato resting on the cutter blades in the article positioning opening of the article locator.

FIG. 2 shows one cutting station of the article slicer. A plurality of tomatoes 11 are placed in the slicer, with each tomato having a longitudinal axis 12, a stem portion 16, possibly a stem 14, and a heel portion 18. The stem portion and heel portion are at opposite ends of the tomato, with the axis 12 passing through them. The tomato 11 is placed on a plurality of cutter blades 20 that are spaced apart, as shown by the spaces 22 in FIG. 1.

The ends of the cutter blades 20 are mounted on frames, with all of the blades in each frame positionable in the same plane, with first alternate blades mounted on one frame and the second alternate blades mounted on another frame. The ends of the blades are oscillated in arcuate paths, with one set of blades movable in directions opposite to the other set. The opposite directions of oscillation of the alternate blades results in one set of blades oscillating along their lengths in one direction with a rocking movement while the other set of blades oscillates along their lengths in the opposite direction also with a rocking movement, thereby enhancing the cutting function of the blades. This is disclosed in more detail in the Publication No. 2006/0225547, which is incorporated herein by reference.

Figure 6:
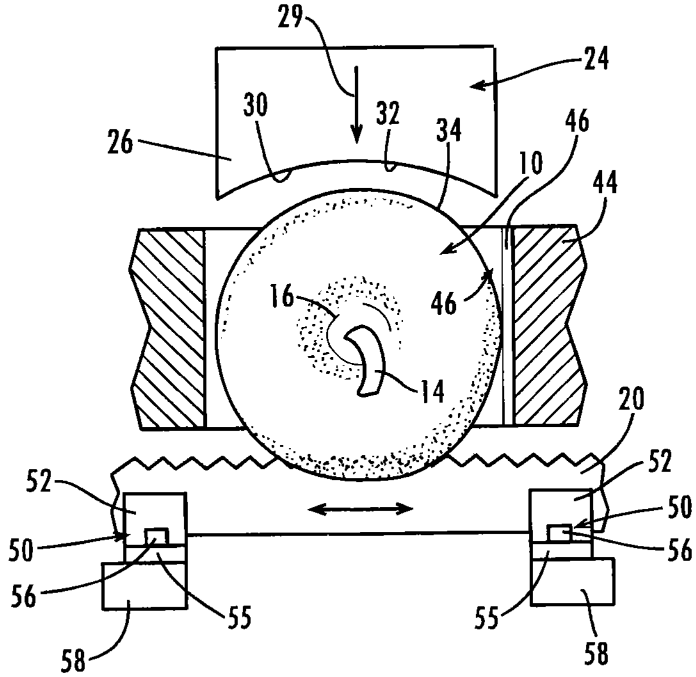
FIG. 6 is a side view of a tomato showing the tomato in the article locator and with the pusher 24 above the tomato and the cutter blades below the tomato.

As shown in FIGS. 2 and 6, an article pusher 24 is positioned above each tomato 11 for the purpose of pushing the tomatoes downwardly through the cutter blades 20. The article pusher includes a plurality of pusher fins 26 that are parallel to and spaced from one another, defining parallel fin spaces 28 between the fins and distal ends 30. The fin spaces 28 are of sufficient breadth to safely pass about and straddle the cutter blades 20 when the pusher is lowered in the downward direction as indicated by arrow 29. The fins are received in the blade spaces 22 between the cutter blades 20, thereby pushing the sliced tomatoes beyond the cutter blades 20.

In order to make sure that the tomatoes 11 are properly received and urged through the cutter blades 20, the lower end surfaces 30 of the pusher fins 26 are spaced from one another and face the tomatoes and are of varied lengths. The array of the lower ends of the fins may be contoured so that together they form a generally concave surface 32. This surface is formed so as to approximately match the convex facing surface 34 of the adjacent tomato 11. Thus, when the article pushers 24 are moved downwardly into engagement with the tomatoes 11, the contoured, concave facing surface 32 of the pusher fins 26 bears against the rounded surface of the tomatoes, usually spreading its pushing force over a significant surface area of the facing surface of the tomatoes, thus avoiding damage to the tomatoes.

The shape of the pushing surface of the fins 26 also tends to initially align the tomatoes on the cutter blades and then push the tomatoes downwardly and to hold the tomatoes in their fixed attitudes on the cutter blades 20, without having the tomatoes slip, rotate or otherwise move transversely with respect to the cutter blades. The thusly stabilized tomatoes 11 tend to move vertically through and beyond the cutter blades 20, with the pushing surfaces of the fins passing between and beyond the blades so that the tomatoes 11 are cut into slices that include end slices 16 and 18 and intermediate slices 42. The end slice 16 is the stem slice and the end slice 18 is the heel slice.

Figure 3:
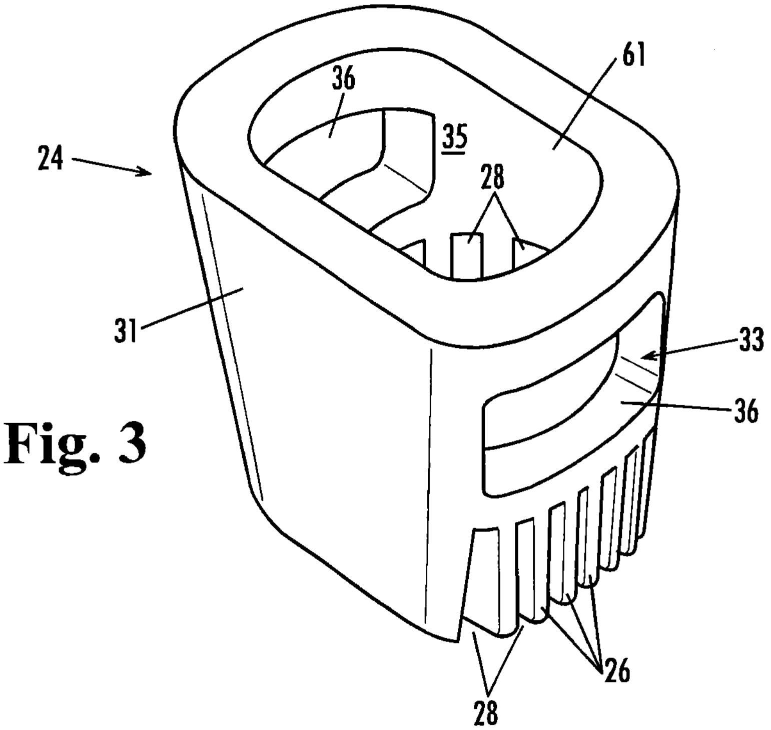
FIG. 3 is a perspective view of one of the pushers of the article slicer.

As shown in FIGS. 2 and 3, the article pushers 24 include an upper body portion 31 with the fins 26 extending in a downward direction from the upper body portion. A passage 33 is formed in the upper body portion that communicates with the fin spaces 28. The passage 33 includes an internal space 35 that communicates with the fin spaces and an external opening 36 that communicates from outside said upper body portion with the internal space. This is used for the movement of a high pressure fluid spray into the article pushers for removing residue from the surfaces of the pushers, particularly from the surfaces of the fins. The high pressure spray usually moves downwardly through the fins and about the cutter blades. Any particles such as peel, seeds, or other remnants of the tomatoes handled by the slicer will be removed by the rush of the fluid from the fins and cutter blades.

External openings 36 may be formed on opposite sides of the upper body portion if desired. Preferably an external opening will face the front of the slicer for permitting the high pressure fluid to be easily applied, even with the slicer in operation. The fluid may be applied to the internal surfaces of the pushers without having to dismantle the pushers or the adjacent elements of the slicer.

The fluid to be applied may include a sanitizing additive for the purpose of avoiding an accumulation of undesirable surface contamination. The fluid may be a liquid, a gas such as air, or a mixture thereof.

FIG. 3 illustrates an embodiment of an article pusher 24 that may include a fluid sprayer positioned above the vertical fins 26 of the article pusher. The article pushers may have upper openings 61 that form a space in which the nozzles can occupy. The fluid may be emitted under pressure from the nozzle 60 and sprayed in a general direction toward the fins 26 of the pushers and toward the cutter blades 20, thereby applying the fluid to these parts and the surrounding parts of the article slicer. The sprayer fluid may be emitted in each cycle of the pushers, at intervals before, during or after the article pushers 24 engage the tomatoes. The spray of fluid may be emitted at times when the tomatoes are not present in the slicer. Since in this embodiment the fluid is released within the fins of the article pusher, the fluid tends to wash the fins and the cutter blades. If an antimicrobial is used in the fluid, the fluid will tend to sanitize the fins. If the fluid is applied when the tomatoes are being contacted by the fins, the fluid might assist in urging the tomatoes on through the cutter blades. Also, the fluid may be emitted when there are no tomatoes in the vicinity of the fins and cutter blades, with the fins moved downwardly about the cutter blades to assure the fluid is applied to the cutter blades.

While the fluid is described as being applied internally of the pusher fins, the nozzles may be placed elsewhere, such as beside the pushers and in alignment with the fins and cutter blades so that the fluid reaches these surfaces.

Figure 4:
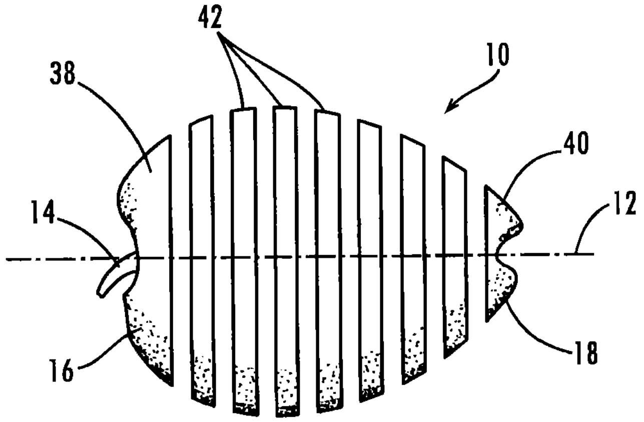
FIG. 4 is a side schematic view of sliced tomatoes, with the slices of the tomatoes expanded to emphasize how the cuts are made through the tomatoes.

As shown in FIG. 4, the cutter blades usually are arranged so that the intermediate slices 42 of the tomatoes will be of equal thickness and the end slices 16 and 18 are likely to be somewhat thicker than the intermediate slices. This assures that the intermediate slices are all of acceptable diameter for use at the restaurant and the end slices are not transported to the restaurant, avoiding the food preparer having to discard the end slices. The end slices may be separated from the intermediate slices in the manner described in more detail in Pub. No.: US 2006/0225547 A1, which is incorporated herein by reference.

While FIG. 2 shows the cutting edges of blades 20 all at one height, the blades may be formed of different heights so that the cutting edges of the end cutter blades are somewhat taller than the intermediate cutter blades. This tends to provide a concave support surface for the facing convex surface of the tomatoes, thereby reducing any tendency of the tomatoes to move transversely prior to and during the cutting operation.

As shown in FIGS. 1, 2, 5 and 6, article locator 44, also known as the article positioning plate, is located over the cutter blades 20. A series of article positioning openings 46 are formed in the article locator, one opening for each pusher 24. The article locator and its openings 46 tend to maintain the tomatoes 11 in a proper alignment on the edges of the cutter blades 20 for slicing. The openings 46 may be formed of a size and shape that corresponds to the size and shape of the tomatoes, and the size of the openings 46 may be larger than the anticipated sizes of the tomatoes so that the article locator usually avoids frictionally engaging and avoids supporting the tomatoes. The article locator is easily changeable so the size of the positioning openings may be selected to be of a breadth great enough for allowing the tomatoes to come into direct contact with the cutter blades under the influence of gravity. But the positioning openings are small enough to surround the tomatoes and confine the tomatoes in the correct location on the blades and in alignment with the pushers 24.

Figure 5:
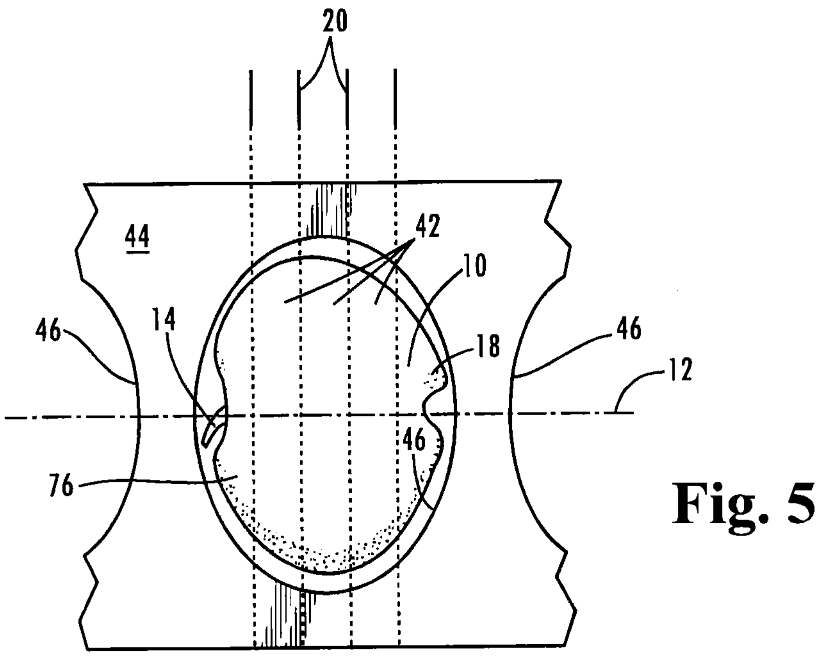
FIG. 5 is a plan view of a tomato received in the article positioning opening of the article locator.

As shown in FIG. 5, the positioning openings 46 of the locator 44 also may be oval shaped. The oval shape of the openings approximately matches the cross sectional shape of the tomatoes when the tomatoes are placed on their sides with the longitudinal axes of the tomatoes oriented at a right angle with respect to the cutter blades and at a right angle with respect to the long axis of the oval shape of the openings. If a tomato is inadvertently placed in some other attitude in an oval-shaped positioning opening, the tomato usually will not properly fit into the opening, thus alerting the operator of the article slicer that the tomato needs to be repositioned in the opening. The oval shape of the positioning openings also tends to assure the tomatoes are always sliced transversely to the longitudinal axes of the tomatoes.

FIGS. 2 and 6 show cutter blade guides 50 that are used to guide the cutter blades 20 during their back and forth oscillations. Blade guides 50 each may include a monolithic block that includes a series of equally spaced blade alignment slots 54 that are oriented parallel to the lengths of the blades 20 and receive the lower portions of the blades so that the teeth of the blades may be left exposed. The slots 54 are deep enough to accommodate the vertical movements of the blades. The cutter blades freely slide along the lengths of the slots 54 while the facing surfaces of the slots hold the blades upright.

Cutter blade guides 50 are mounted in pairs on opposite sides of and spaced below the article positioning openings 46, in alignment with article positioning openings 46. With this arrangement, when the cutter blades 20 oscillate, their non-longitudinal movements are constrained by the blade alignment slots 54 of the cutter blade guide 50 so that the blades tend to remain in their proper orientation without tilting, bowing, or otherwise deviating from their intended positions. The close placement of the blade alignment slots 54 with respect to the openings 46 of the article locator 44 assures that the stability of the blades 20 is maintained at least at the edge of the openings 46. The fins 26 of the pusher 24 pass between the blades 20 and the spaces 28 between the fins allow the fins to straddle the blades when the pusher moves downwardly and partially through the blades 20.

FIG. 1 shows the integrated article slicer and pick and placer in more detail. An entrance conveyor 64 is mounted in front of the article slicer 10. The entrance conveyor is a surface conveyor having continuing series of slats 66 that are advanced in increments toward the article slicer 10. Each slat 66 includes a row of openings 68 that are aligned with the pushers 46 of the article slicer. Articles to be sliced, such as tomatoes 11, are placed in the smaller openings and the slats 66 are advanced toward the article slicer. The openings 60 are slightly smaller than the tomatoes and tend to firmly hold the tomatoes in place as the movements of the slats carry the tomatoes toward the article slicer.

The article slicer includes a support frame 74 that includes front uprights 75 and rear uprights 77. The pick and placer 76 is at the front of the article slicer 10 so that its suction cups 111-116 may reciprocate back and forth between the entrance conveyor 64 and the article locator 44.

Movable support plate 78 is movably mounted to the support frame 74. The movable support plate 78 is supported in a manner that allows it to reciprocate fore and aft with respect to the support frame 74. Movable support plate 78 is carried at its ends on slides 80, and the slides 80 are slidable on primary stroke sliding shafts 81 that are supported by the front and rear uprights 75 and 77 at the fore and aft edges of support frame 74. Primary stroke cylinders 82 and 83 are also mounted to the rear uprights 77 of the support frame 74, and the shafts of the primary stroke cylinders 82 and 83 are connected at their distal ends to the sliders 80. Actuation of the primary stroke cylinders 82 and 83 results in fore and aft reciprocation of the sliders 80 and the movable support plate 78.

Timing shaft 89 extends transversely to the article slicer and is mounted on the rear uprights 77 of the support frame 74. The sprockets 90 at the ends of the timing shaft 89 each engage the teeth of a rack 92 and the racks 92 are each secured to the slides 80. This maintains the opposite lateral ends of the movable support plate 78 in perfect alignment as it reciprocates.

Secondary stroke sliding bearings 94-97 are mounted on the movable support plate 78 and the pusher shafts 98-101 are guided vertically by the secondary stroke sliding bearings 94-97. Pusher support platform 103 is located below movable support plate 78. The lower ends of the pusher shafts 98-101 are mounted to suspended pusher support platform 103. Secondary stroke cylinder 105 is mounted on movable support plate 78 and its rod extends down to and is connected to the pusher support platform 103. Secondary stroke cylinder 105 vertically reciprocates the pusher support platform 103.

Pushers 24 are mounted to and extend downwardly from the pusher support platform 103 toward the article positioning openings 46 that are formed in the article locator 44. When the secondary stroke cylinder 105 reciprocates the pusher support platform, the pushers reciprocate through the article locator 44 and about the cutter blades.

With this arrangement, when the primary stroke cylinders 82 and 83 are distended and push their slides 80 from the retracted position to the extended position of the pushers 24, the pushers 24 become vertically aligned with their respective article positioning openings 46. When the primary stroke cylinders 82 and 83 retract their shafts, the movable support plate 78 retracts back into a position over the support frame, where the pushers are positioned out of registration with the article positioning openings 46. This leaves the article positioning openings free to receive the pick and placer.

Thus, the primary stroke cylinders 83 and secondary stroke cylinder 105 function as pusher power means for moving the article pushers laterally and vertically. Other means may be adopted to perform as pusher power means.

Pick and placer 76 is also carried by movable support plate 78 and includes a laterally movable support platform 107. Pickers 111-116 are suspended from the pick and placer support platform 107. Pick and placer secondary stroke cylinders 121-126 are mounted on the pick and placer support platform 107 and their cylinder rods extend below the pick and place platform 107 and are connected to and function to lift and lower the pickers 111-116.

Pick and place support platform 107 is mounted at the ends of pick and place sliding shafts 108 and 109. The sliding shafts 108 and 109 are received in bearings 110 and 111 and in bearings 112 and 113, respectively. The bearings are carried by the movable support plate 78. Accordingly, when the movable support plate 78 moves, the pickers also move in the same direction.

A pair of pick and place primary cylinders 141 and 142 are supported on the movable support plate 78 by support bracket 143. The shafts of the pick and place primary cylinders 141 and 142 are connected to the pick and place support platform 107. Thus, the pick and place primary cylinders 141 and 142 function to reciprocate the pickers 111-116 with respect to the movable support plate 78. This allows the lateral movements of the pickers 111-116 to be greater than the lateral movements of the pushers 24. This allows the pushers 24 to move a relatively short distance between their extended positions over the article locator 44 and their retracted positions, while the pickers 111-116 move in a larger amplitude and reach out farther to pick the tomatoes 11 from the entrance conveyor 64 and retract to place the tomatoes on the article locator 44.

Thus, the pick and place primary cylinders 141 and 142 and the pick and placer secondary stroke cylinders 121-126 function as pick and placer power means for moving the pickers 111-116 laterally and vertically.

It should be noted that even though the pick and placer 76 includes its own primary cylinders 141 and 142 to reciprocate the pickers 111-116, the cylinders 141 and 142 are mounted on the movable support plate 78 and the movable support plate 78 also reciprocates in response to its primary stroke cylinders 82 and 83.

Vacuum pumps 131-136 are carried by the pick and placer support platform 107 and function to apply a reduced air pressure to the pickers 111-116.

This integrated arrangement between the pickers and the slicer allows the pickers 111-116 to move simultaneously with the movements of the pushers 24 so that when the pushers move, the pickers also move. However, the pickers have extra amplitude of movement so as to be extended farther out over the entrance conveyor 64 to reach out and pick up the tomatoes 11. Then when the tomatoes are in the grasp of the pickers 111-116, the system is reversed so that both the pushers 46 and the pickers are retracted so the pushers are moved out of the way and the pickers bring the tomatoes to be placed in the article positioning openings 46 of the article locator 44.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. An integrated pick and placer and article slicer for simultaneously placing several articles on the article slicer and for simultaneously slicing the several articles received from said pick and placer, said article slicer comprising:

a plurality of cutter blades extending in parallel planes and spaced from one another for cutting the articles into slices, an article locator positioned above said cutter blades and configured for aligning the articles with said cutter blades, a movable support plate, article pushers supported by said movable support plate for pushing a plurality of the articles downwardly through the article locator and through said cutter blades, pusher power means operatively connected to said article pushers for moving the article pushers:

forwardly from withdrawn positions spaced laterally behind the article locator to over the article locator, downwardly through said article locator into engagement with articles located at the cutting blades and downwardly through the cutter blades to push the articles through the cutter blades, upwardly from the cutter blades back to the positions over the article locator, and rearwardly from the positions over the cutter blades to the withdrawn positions, said pick and placer supported by said movable support plate for movement in timed relationship with the movements of said pushers, and pick and placer power means for moving the pick and placer:

forwardly with the forward movement of said pushers from over positions of said article locator to positions of articles to be picked, rearwardly with the rearward movement of said pushers to move the picked articles to be sliced to the positions over said article locator, and downwardly to place the articles in the article locator.

2. The integrated pick and placer and article slicer of claim 1, wherein said pick and placer power means is movable in unison with said forward and rearward movements of said pushers for moving said pick and placers forwardly away from said pushers when said pushers are moved forwardly and rearwardly toward said pushers when said pushers are moved rearwardly.

3. The integrated pick and placer and article slicer of claim 1, and further including a picker support plate, said pickers mounted on said picker support plate, and fluid actuated cylinders for moving said picker support plate with respect to said movable support plate.

4. The integrated pick and placer and article slicer of claim 1, wherein said article pushers comprise an upper body portion, a plurality of fins extending in a downward direction from said upper body portion, said fins oriented parallel to one another and defining fin spaces between said fins for receiving said blades, said fins including distal ends for passing through said blade spaces, a passage defined by said upper body portion, including an entrance opening extending laterally from outside said upper body portion to said fin spaces for passing fluid from outside said upper body portion to said fin spaces, such that fluid may pass laterally from outside said upper body portion and though said passage and move through said fin spaces and contact said fins.

* * * * *